(12) United States Patent
Hatley

(10) Patent No.: US 6,536,283 B1
(45) Date of Patent: Mar. 25, 2003

(54) ASSEMBLIES AND METHODS FOR INSPECTING PIPING OF A NUCLEAR REACTOR

(75) Inventor: Kenneth J. Hatley, Madison, NJ (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/376,517

(22) Filed: Aug. 18, 1999

Related U.S. Application Data

(62) Division of application No. 08/974,855, filed on Nov. 20, 1997, now Pat. No. 5,982,839.
(60) Provisional application No. 60/944,096, filed on Apr. 23, 1997.

(51) Int. Cl.$^7$ .................. G01N 9/24; G21C 17/00
(52) U.S. Cl. .................. 73/622; 73/619; 73/637; 376/249
(58) Field of Search .................. 73/622, 637, 638, 73/640, 618, 639, 628, 643, 623; 376/245, 249

(56) References Cited

U.S. PATENT DOCUMENTS

| | | | |
|---|---|---|---|
| 3,934,457 A | * 1/1976 | Clark et al. .................. 73/637 |
| 3,988,922 A | * 11/1976 | Clark et al. .................. 73/637 |
| 4,010,636 A | * 3/1977 | Clark et al. .................. 376/249 |
| 4,744,251 A | 5/1988 | Shirasu et al. .................. 73/622 |
| 4,879,973 A | 11/1989 | Maeyama et al. .................. 122/379 |
| 4,893,512 A | 1/1990 | Tanimoto et al. .................. 73/622 |
| 5,568,527 A | 10/1996 | Richardson et al. .................. 376/245 |
| 5,586,155 A | * 12/1996 | Erbes et al. .................. 376/249 |

* cited by examiner

Primary Examiner—Daniel S. Larkin
Assistant Examiner—Jacques Saint-Surin
(74) Attorney, Agent, or Firm—Armstrong Teasdale LLP

(57) ABSTRACT

Automated inspection assemblies for scanning pipes of a nuclear reactor are described. In one embodiment, the assembly includes a mounting subassembly and a scanning subassembly. The mounting subassembly includes a clamp configured to be mounted to selected pipes in a nuclear reactor pressure vessel, and the scanning subassembly is movably coupled to the mounting subassembly. The scanning assembly includes a scanning head configured to scan at least a portion of the circumference of the pipe to be inspected, and the scanning head includes a substantially "U" shaped transducer support assembly sized to receive the pipe. Transducer elements are coupled to the transducer support assembly legs, and the transducer support assembly is configured to rotate about the pipe to inspect the pipe.

22 Claims, 4 Drawing Sheets

ASSEMBLIES AND METHODS FOR INSPECTING PIPING OF A NUCLEAR REACTOR

CROSS-REFERENCE TO RELATED PATENTS

This application is a divisional application of U.S. application Ser. No. 08/974,855 filed Nov. 20, 1997 now U.S. Pat. No. 5,982,839 which claims the benefit of U.S. Provisional Application No. 60/944,096, filed Apr. 23, 1997.

BACKGROUND OF THE INVENTION

This invention relates generally to inspecting piping and, more particularly, to assemblies for inspecting piping, such as core spray piping, in nuclear reactors.

Nuclear reactors have many piping systems, and such piping systems are utilized, for example, to deliver feedwater to the reactor pressure vessel (RPV) and to deliver steam from the RPV to a power generator. Numerous pipes also typically are located within the RPV and sometimes are located in crowded spaces with many other pipes and other reactor equipment.

Over the life of the reactor, the piping systems are inspected to verify their integrity. For example, in accordance with NCR I&E Bulletin No. 70-13, issued May 12, 1980, core spray spargers and associated piping is visually inspected at every refueling outage. Based on such inspections, the piping systems may be modified, upgraded, repaired or replaced.

To inspect pipes within the RPV, ropes and poles typically are utilized for manual manipulation of simple tools or manual delivery of dedicated automated tools. More specifically, and during reactor shut down, an operator typically stands on a bridge positioned over the open RPV and using ropes and poles, which may extend more than thirty (30) feet below the bridge into the RPV, the operator positions cameras used to visually inspect the RPV piping. After visually inspecting the RPV piping, the operator conducts a supplemental ultrasonic examination (UT) to more thoroughly examine the piping and to verify the extent of any cracks identified visually. Both the ability to perform and the quality of such inspections greatly depends on the dexterity of the operator.

Due to the amount of piping to be inspected during reactor shut down, performing visual inspection and UT can be time consuming. It is desirable, of course, to limit the time required to perform repairs and inspections in the RPV since the reactor must be shut down to perform such tasks. Reducing the amount of time required to perform such inspections and repairs also would facilitate reducing the operator radiation exposure per task.

Performing visual inspection and UT also typically require extensive use of the bridge, which inhibits the ability to perform other inspections and repairs of RPV components. Particularly, many RPV inspections and repairs require an operator to manipulate tools from the bridge, and the amount of activity on the bridge generally is limited. Therefore, while the piping inspections are being conducted, other repairs and inspections cannot be performed.

It would be desirable to provided an automated piping inspection assembly particularly suitable for use in nuclear reactor applications which is easy to install and controllable for performing high quality piping inspections. It also would be desirable to provide such an inspection assembly which may be operated from a remote location other than the bridge to facilitate reducing reactor shut-down time.

BRIEF SUMMARY OF THE INVENTION

These and other objects may be attained by an automated inspection assembly which includes a remotely operated vehicle (ROV) coupled to a mounting subassembly and a scanning subassembly controllable by a computerized motion control system. In one embodiment, the mounting subassembly includes a clamp configured to be mounted to selected pipes within the RPV, and the scanning subassembly is movably coupled to the mounting subassembly. The scanning subassembly includes a scanning head configured to perform an ultrasound inspection of the piping. The scanning head is configured to scan at least a portion of the circumference of the pipe to be inspected, and the scanning head includes a substantially "U" shaped transducer support assembly, and transducers are coupled to the ends of the transducer support assembly legs.

In operation, the remotely operated vehicle is controlled to transport the mounting and scanning subassemblies to the pipe to be inspected, and the mounting subassembly is mounted to the pipe. The scanning head is positioned proximate the portion of the pipe to be inspected so that the pipe extends through the legs of the transducer support assembly. The transducer support assembly is then rotated about the pipe to inspect the integrity of the pipe.

The above described automated inspection assembly is particularly suitable for use in nuclear reactor applications and is easy to install and controllable for forming high quality piping inspections. The assembly also may be operated from a remote location other than the bridge.

DETAILED DESCRIPTION OF THE INVENTION

Figure 1:
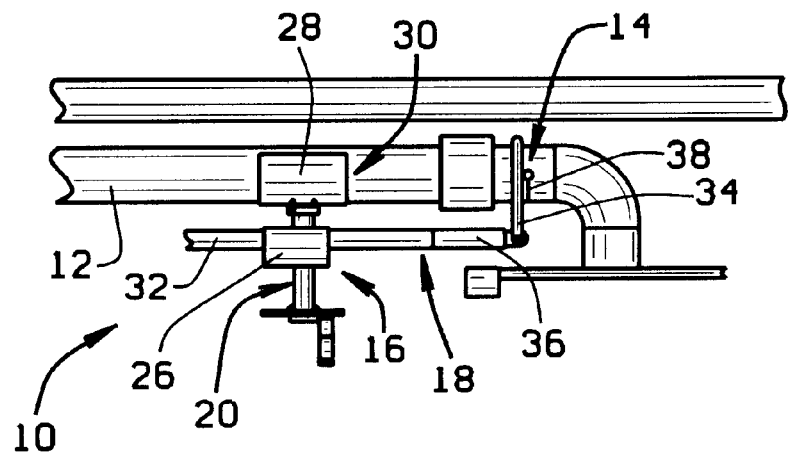
FIG. 1 is a side view schematic illustration of an inspection assembly in accordance with one embodiment of the present invention coupled to a pipe and positioned to inspect a first portion of the pipe.

FIG. 1 is a side view schematic illustration of an inspection assembly 10 in accordance with one embodiment of the present invention coupled to a pipe 12 and positioned to inspect a first area, or portion, 14 of pipe 12. Inspection assembly 10 includes a mounting subassembly 16 and a scanning subassembly 18. Mounting subassembly 16 includes a support element 20, or x-axis tube, and a coupling element 26. X-axis tube 20 is coupled to a clamp 28, which is removably coupled to a segment 30 of pipe 12. X-axis tube 20 also is configured to rotatably couple to a remotely operated vehicle (not shown in FIG. 1). Coupling element 26 is movably coupled to scanning subassembly 18 and x-axis tube 20.

Scanning subassembly 18 includes a scanning arm 32, or y-axis tube, and a scanning head 34. Scanning arm 32 is slidably coupled to coupling element 26 of mounting subassembly 16. More particularly, scanning arm 32 extends through an opening (not shown in FIG. 1) in coupling element 26.

Scanning head 34 is substantially "C" shaped and is movably coupled to an end 36 of scanning arm 32. Particularly, scanning head 34 is pivotally and rotatably coupled to end 36 of scanning arm 32. Scanning head 34 includes a transducer support assembly 38 for performing inspections. When inspecting pipe first portion 14, for example, scanning head 34 extends substantially transversely with respect to scanning arm 32.

Figure 2:
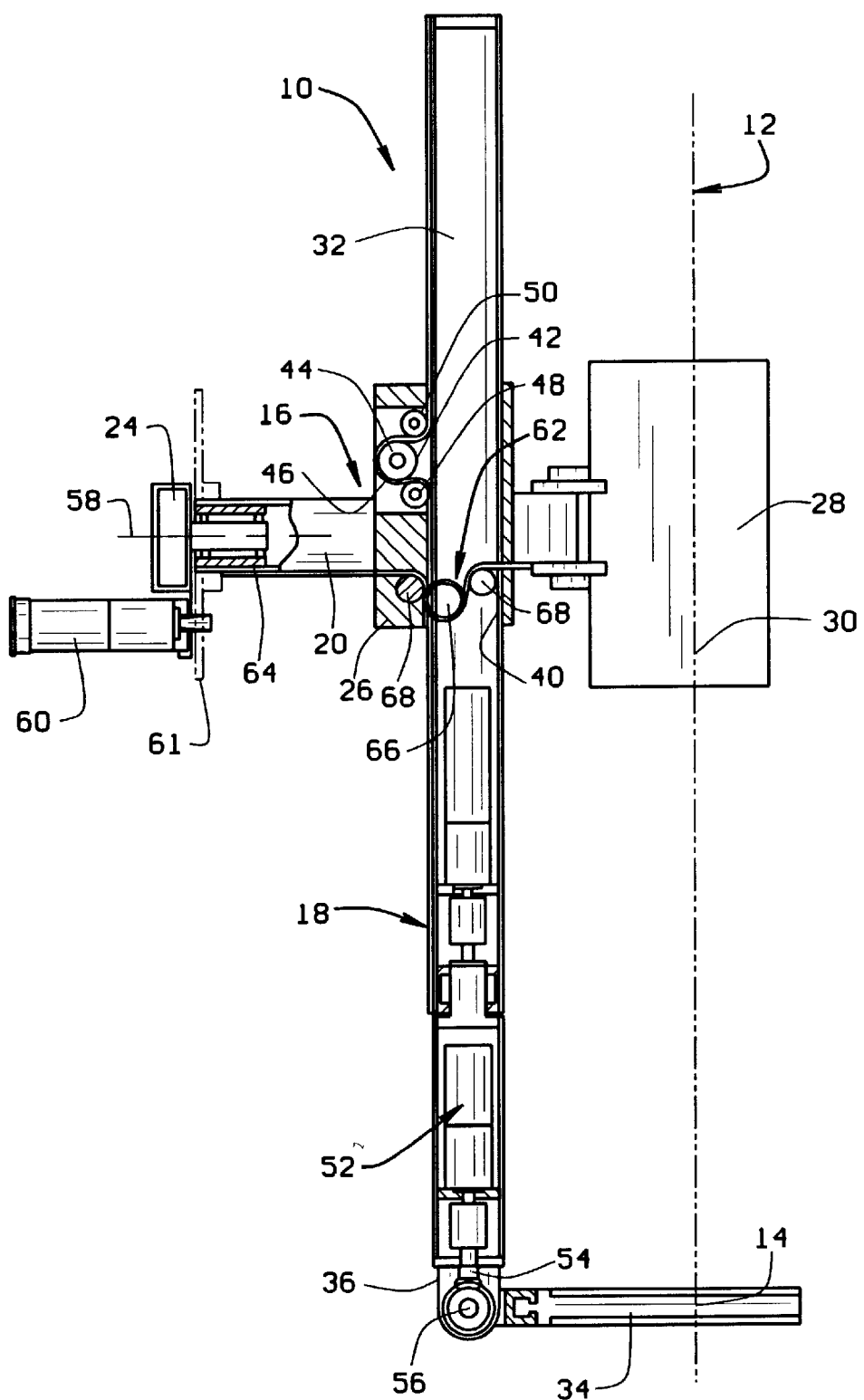
FIG. 2 is an exploded side view schematic illustration of the inspection assembly shown in FIG. 1.

FIG. 2 is an exploded side view of inspection assembly 10 positioned to inspect first portion 14 of pipe 12. Coupling element 26 includes a first bore, or opening, 40 extending therethrough and sized to receive scanning arm 32. Opening 40 is provided with a keyway or similar device (not shown in FIG. 2) so that scanning arm 32 may slide through coupling element opening 40, but is substantially prevented from rotating within opening 40 relative to coupling element 26. Coupling element 26 further includes an arm driving assembly 42, e.g., a computerized servo motor fitted with a gear 44, a belt 46, and two idlers 48 and 50, respectively, adjacent opening 40. Arm driving assembly 42 is coupled to scanning arm 32 and is configured to move scanning arm 32 relative to coupling element 26 through opening 40, i.e., along a y-axis.

Scanning arm 32 includes a head driving assembly 52 adjacent end 36 and coupled to scanning head 34. Head driving assembly 52 is coupled to a gear 54 and is configured to move scanning head 34 relative to scanning arm 32. Particularly, head driving assembly 52 is configured to rotate scanning head 34 about a pivot point 56 with respect to an x-axis, e.g., the horizontal axis, a y-axis, e.g., the vertical axis, and a z-axis extending through pivot point 56.

Coupling element 26 also includes a second bore or opening (not shown in FIG. 2) sized to receive x-axis tube 20. X-axis tube 20 extends through the second opening and is slidably engaged to coupling element 26. The second opening, like first opening 40, is provided with a keyway or similar device to substantially prevent x-axis tube 20 from rotating within the second opening relative to coupling element 26.

X-axis tube 20 also is rotatably mounted to a rod 58 which is affixed to a mount member 24. Mount member 24 is configured to couple to a remotely operated vehicle (not shown in FIG. 2) and includes a driving assembly 60, e.g., a computerized servo motor fitted with a gear and belts 61, which is coupled to support member 20 and configured to rotate support member 20 relative to mount member 24.

Coupling element 26 also includes a driving assembly 62. Driving assembly 62 may, for example, be a servo motor 66 fitted with a belt 64 and idlers 68, and is configured to move coupling element 26 with respect to clamp 28 along the same axis as x-axis tube 20, i.e., along an x-axis. Accordingly, and with respect to the orientation illustrated in FIG. 2, scanning arm 32 sometimes is referred to as the y-axis tube and support element 20 sometimes is referred to as the x-axis tube.

An air ram (not shown in FIG. 2) is secured to x-axis tube 20 and is coupled to clamp 28. The air ram is configured to releasably engage clamp 28 to pipe 12.

Figure 3:
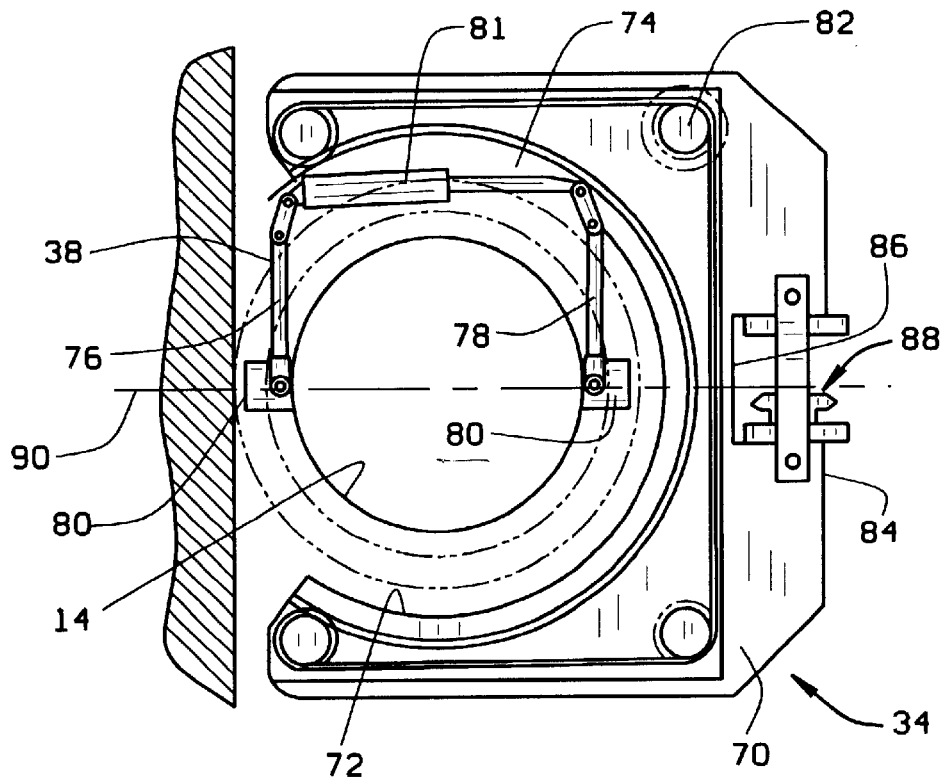
FIG. 3 is an exploded top view schematic illustration of the scanning head of the inspection assembly shown in FIG. 1.

FIG. 3 is an exploded top view of scanning head 34 of inspection assembly 10. As shown more clearly, scanning head 34 includes a substantially "C" shaped element 70 having an inner circumference 72 sized to receive first portion 14 of pipe 12. Transducer support assembly 38 is substantially "U" shaped and also is sized to receive first portion 14 of pipe 12. In addition, transducer support assembly 38 is movably coupled to inner circumference 72 of substantially "C" shaped element 70.

Transducer support assembly 38 includes a back portion 74 having first and second legs 76 and 78 pivotally mounted thereto and extending from opposite ends thereof. Back portion 74 of transducer support assembly 38 has a radius of curvature substantially the same as the radius of curvature of inner circumference 72 of substantially "C" shaped element 70. A transducer element 80 is coupled to each leg 76 and 78, respectively, so that transducer elements 80 are substantially aligned.

Scanning head 34 also includes an air ram 81 coupled to transducer support assembly 38. Air ram 81 is configured to position transducer elements 80 in contact with pipe portion 14. Particularly, when air ram 81 is pressurized, legs 76 and 78 move toward each other and into contact with pipe portion 14.

Scanning head 34 further includes a transducer driving assembly 82, e.g., a computerized servo motor, for moving transducer support assembly 38 relative to substantially "C" shaped element 70. Particularly, transducer driving assembly 82 is coupled to transducer support assembly 38 and is configured to move back portion 74 of transducer support assembly 38 along inner circumference 72 of substantially "C" shaped element 70, thus rotating transducer support assembly 38 about pipe first portion 14.

A rear portion 84 of substantially "C" shaped element 70 includes a notch 86. A gear 88 is positioned in notch 86 and coupled to scanning head 34. Gear 88 also is coupled to gear 54 (FIG. 2) to facilitate rotating scanning head 34 about an axis 90, i.e. the z-axis (FIG. 2).

Figure 4:
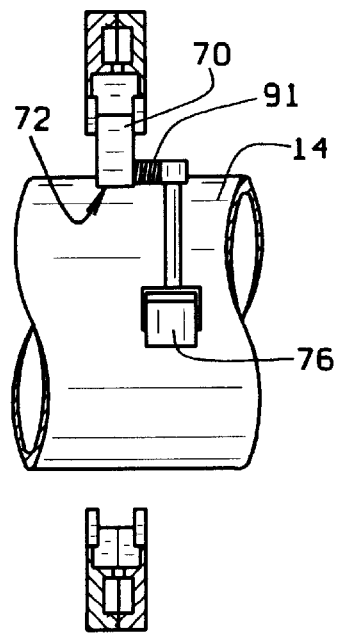
FIG. 4 is an exploded schematic partial front view illustration of the first portion of the pipe extending through the scanning head shown in FIG. 3.

FIG. 4 is an exploded schematic partial front view illustration of pipe first portion 14 extending through scanning head 34. Particularly, as shown, pipe first portion 14 extends through substantially "C" shaped element 70. During ultrasound inspection, pipe first portion 14 extends between transducer support assembly legs 76 and 78 (only leg 76 is shown in FIG. 4), and each transducer leg 76 and 78 is substantially "L" shaped. Accordingly, transducer elements 80 (only one transducer element 80 is shown in FIG. 4) are spaced from substantially "C" shaped element 70.

In addition, a spring 91 is attached to each transducer leg 76 and 78 to facilitate spacing legs 76 and 78 from pipe portion 14. Springs 91 are biased so that when air ram 81 is not pressurized, springs 91 move legs 76 and 78 away from pipe portion 14 to facilitate repositioning scanning head 34 to other positions on pipe 12.

Figure 5:
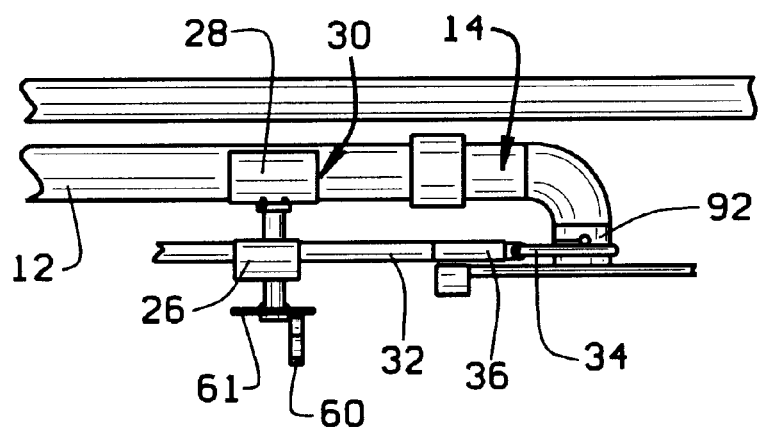
FIG. 5 is a side view schematic illustration of the inspection assembly shown in FIG. 1 coupled to the pipe shown in FIG. 1 and positioned to inspect a second portion of the pipe.

FIG. 5 is a side view schematic illustration of inspection assembly 10 positioned to inspect a second portion 92 of pipe 12. Second portion 92 of pipe 12 extends substantially perpendicularly from first pipe portion 14, and has a substantially similar diameter as first pipe portion 14. Clamp 28 is coupled to pipe segment 30, and scanning arm 32 extends from coupling element 26 so that scanning head 34 receives pipe second portion 92. In this position, scanning head 34 extends substantially co-planarly with scanning arm 32.

Figure 6:
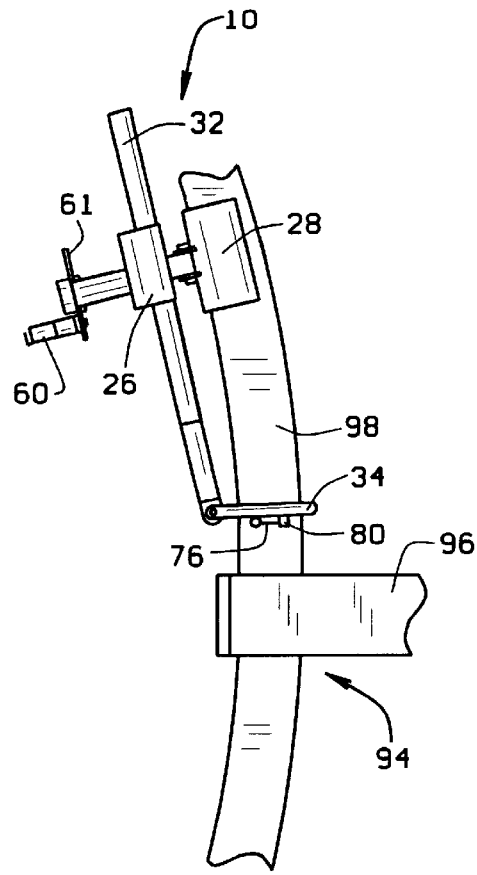
FIG. 6 is a top view schematic illustration of the inspection assembly shown in FIG. 1 coupled to core spray piping and positioned to inspect a header pipe.

FIG. 6 is a top view schematic illustration of inspection assembly 10 coupled to core spray piping 94 including a T-box 96, or junction box, and header pipes 98. Scanning head 34 is positioned to inspect one of header pipes 98. As shown more clearly in FIG. 6, transducer support assembly legs 76 and 78 (only transducer support assembly leg 76 is shown in FIG. 6) are substantially "L" shaped.

Figure 7:
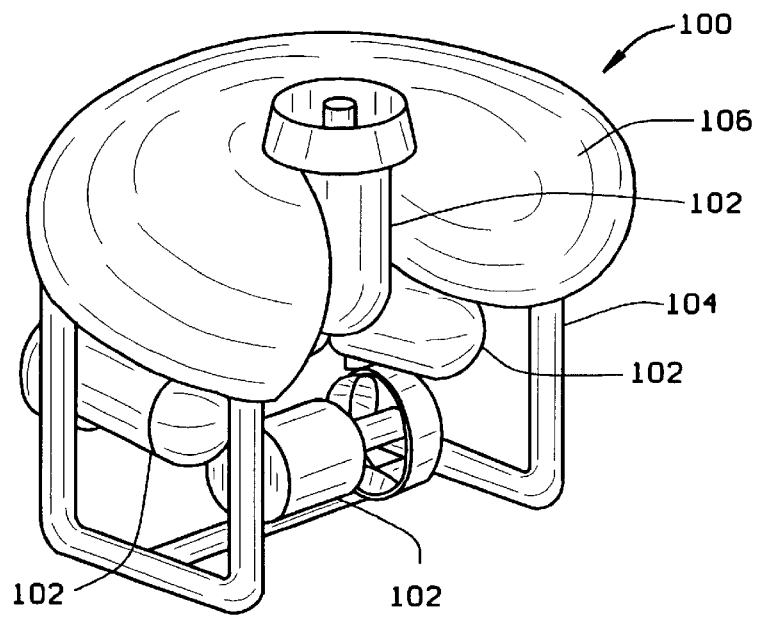
FIG. 7 is a perspective view of a remote operated vehicle utilized in accordance with one embodiment of the present invention.

FIG. 7 is a perspective view of a remotely operated vehicle (ROV) 100 utilized in accordance with one embodiment of the present invention. ROV 100 includes four propellers 102 which are coupled to a cage element 104 and are positioned to facilitate steering ROV 100 through water, e.g., the water in a reactor pressure vessel of a boiling water reactor. ROV 100 also includes a buoy element 106, which provides ROV 100 with a positive buoyancy, and a video camera (not shown in FIG. 7). ROV 100 is electrically coupled to a remote workstation (not shown), and is configured to transmit video signals from the video camera to the workstation. ROVs are well known.

Automated inspection assembly 10 further includes a remote computerized motion control system. Particularly, a control program may be loaded into the remote workstation to generate control signals. The motion control system is coupled to each drive assembly 42, 52, 62 and 82 and the control signals are transmitted to each drive assembly 42, 52, 62 and 82, respectively. Particularly, the motion control system controls the movement of: scanning arm 32 with respect to coupling element 26; scanning head 34 with respect to scanning arm 32; coupling element 26 with respect to mount element 24; and transducer support assembly 38 with respect to substantially "C" shaped element 70. The motion control system also may be coupled to driving assembly 60 and configured to control rotation of support member 20 relative to mount member 24.

In operation, inspection assembly 10 is positioned in an RPV and an operator, using remote control, controls ROV 100 so that inspection assembly 10 moves to the pipe to be inspected, e.g., pipe 12. After reaching pipe 12, motor drive assembly 60 is activated to facilitate mounting clamp 28 to pipe 12. Clamp 28 is then positioned around pipe 12, and the operator actuates the air ram to releasably mount mounting subassembly 16 to pipe 12 with clamp 28. To scan first portion 14 of pipe 12 (FIG. 1), for example, scanning head 34 is positioned proximate first pipe portion 14 so that first pipe portion 14 extends between legs 76 and 78, respectively, of transducer support assembly 38. Particularly, the operator actuates arm driving assembly 42 to position scanning head 34 adjacent pipe first portion 14, and the operator actuates head driving assembly 52 to move scanning head 34 and position pipe first portion 14 between transducer support assembly legs 76 and 78, respectively. The operator then pressurizes air ram 81 to place transducer elements 80 in contact with pipe first portion 14.

The operator then actuates the computerized motion control system to scan pipe first portion 14 and inspect the integrity thereof. Particularly, driving assemblies 42, 52, 62 and 82 are actuated so that transducer elements 80 rotate circumferentially about pipe first portion 14 and move axially with respect to pipe first portion 14. More specifically, transducer elements 80 are moved in accordance with the following cycle: rotate circumferentially about pipe first portion 14 for a first predetermined distance; move axially in a first direction with respect to pipe first portion 14 for a second predetermined distance; rotate circumferentially about pipe first portion 14 for a third predetermined distance; and move axially in a second direction, which is substantially opposite the first direction, for a fourth predetermined distance.

This cycle is then repeated so that substantially the entire circumference of pipe first portion 14 is scanned. During the scan, transducer elements 80 transmit signals to the operator in a well known manner, and such signals are representative of the integrity of inspected pipe first portion 14.

After inspecting pipe first portion 14, second pipe portion 92, for example, may be inspected without removing clamp 28 from pipe 12. Particularly, air ram 81 is depressurized so that transducer elements 80 are spaced from pipe first portion 14 and, referring again to FIG. 5, scanning head 34 is rotated so that it is substantially co-planar with scanning arm 32. Scanning arm 32 is then moved with respect to coupling element 26 so that pipe second portion 92 extends between legs 76 and 78, respectively, of transducer support assembly 38. Air ram 81 is again pressurized and transducer support assembly 38 is then rotated about pipe second portion 92 in accordance with the above described cycle to inspect the integrity of pipe second portion 92.

The above described automated inspection assembly is particularly suitable for use in nuclear reactor applications and is easy to install and controllable for forming high quality piping inspections. The assembly also may be operated from a remote location other than the bridge. Of course, the assembly is not limited to practice in a nuclear reactor environment and is believed to be useful in many other underwater pipe inspection applications.

From the preceding description of the present invention, it is evident that the objects of the invention are attained. Although the invention has been described and illustrated in detail, it is to be clearly understood that the same is intended by way of illustration and example only and is not be taken by way of limitation. For example, the inspection assembly was described in connection with inspecting piping in nuclear reactors. Such assembly may, however, also be utilized to inspect other piping located under water, e.g., oil rig piping. In addition, while the drive assemblies described above included servo motors, such drive assemblies alternatively may include stepper motors. Accordingly, the spirit and scope of the invention are to be limited only by the terms of the appended claims.

What is claimed is:

1. An automated inspection assembly for inspecting piping, said assembly comprising:
   a remotely operated propeller driven vehicle comprising at least one propeller;
   a scanning assembly coupled to said remotely operated vehicle, said scanning assembly configured to perform an ultrasound inspection of the piping, said scanning assembly comprising a scanning arm and a scanning head configured to scan at least a portion of the pipe circumference; and
   a mounting assembly coupled to said scanning assembly and configured to mount said scanning assembly to the piping, said mounting assembly comprising:
      a support element;
      a coupling element movably coupled to said support element; and
      a clamp configured to mount said assembly to the pipe, said clamp coupled to an end of said support element, said coupling element movable along said support element.

2. An assembly in accordance with claim 1 wherein said scanning assembly comprises at least one transducer element.

3. An assembly in accordance with claim 1 wherein said scanning arm is movably coupled to said coupling element, said scanning head movably coupled to an end of said scanning arm.

4. An assembly in accordance with claim 3 wherein said scanning head comprises a substantially "U" shaped transducer support assembly sized to receive the pipe.

5. An assembly in accordance with claim 4 wherein said transducer support assembly is configured to rotate about the pipe.

6. An assembly in accordance with claim 3 wherein said scanning head comprises a substantially "C" shaped element sized to receive the pipe.

7. An assembly in accordance with claim 6 wherein said scanning subassembly further comprises a transducer support assembly coupled to an inner circumference of said "C" shaped element.

8. An assembly in accordance with claim 7 wherein said transducer support assembly is substantially "U" shaped and comprises two leg portions extending from a back portion, a first transducer element coupled to an end of one of said leg portions and a second transducer element coupled to an end of the other of said leg portions.

9. An assembly in accordance with claim 7 wherein said scanning subassembly further comprises a motor configured to move said transducer support assembly with respect to said "C" shaped element.

10. An assembly in accordance with claim 3 further comprising a remote motion control system coupled to at least said scanning head and configured to control movement of said scanning head during a scan.

11. An automated inspection assembly for inspecting piping, said assembly comprising:

a remotely operated propeller driven vehicle;

a scanning assembly coupled to said remotely operated vehicle, said scanning assembly configured to perform an ultrasound inspection of the piping; and a mounting assembly coupled to said scanning assembly and configured to mount to said scanning assembly to the piping, said mounting assembly comprising:
a support element;
a coupling element movably coupled to said support element; and
a clamp configured to mount said assembly to the pipe, said clamp coupled to an end of said support element, said coupling element movable along said support element;

said scanning assembly comprising a scanning arm and a scanning head configured to scan at least a portion of the pipe circumference, said scanning arm movably coupled to said coupling element, said scanning head movably coupled to an end of said scanning arm.

12. An assembly in accordance with claim 11 wherein said scanning head comprises a substantially "U" shaped transducer support assembly sized to receive the pipe.

13. An assembly in accordance with claim 12 wherein said transducer support assembly is configured to rotate about the pipe.

14. An assembly in accordance with claim 11 wherein said scanning head comprises a substantially "C" shaped element sized to receive the pipe.

15. An assembly in accordance with claim 14 wherein said scanning subassembly further comprises a transducer support assembly coupled to an inner circumference of said "C" shaped element.

16. An assembly in accordance with claim 15 wherein said transducer support assembly is substantially "U" shaped and comprises two leg portions extending from a back portion, a first transducer element coupled to an end of one of said leg portions and a second transducer element coupled to an end of the other of said leg portions.

17. An assembly in accordance with claim 15 wherein said scanning subassembly further comprises a motor configured to move said transducer support assembly with respect to said "C" shaped element.

18. An assembly in accordance with claim 11 further comprising a remote motion control system coupled to at least said scanning head and configured to control movement of said scanning head during a scan.

19. A method of inspecting piping, said method comprising the steps of:

transporting a scanning assembly to the piping using a remotely operated propeller driven vehicle, the scanning assembly comprising a scanning arm and a scanning head configured to scan at least a portion of the pipe circumference, the scanning arm movably coupled to the coupling element, the scanning head movably coupled to an end of the scanning arm; and scanning the piping utilizing the scanning assembly.

20. A method in accordance with claim 19 wherein scanning the piping comprises the step of positioning the scanning head proximate the piping.

21. A method in accordance with claim 20 wherein the scanning head comprises a transducer support assembly, and wherein scanning the piping comprises the step of rotating the transducer support assembly around at least a portion of the piping.

22. A method in accordance with claim 19 wherein the scanning assembly is coupled to a mounting assembly, and wherein said method further comprises the step of releasably coupling the mounting assembly to the piping.

* * * * *